(12) United States Patent
Van Horck et al.

(10) Patent No.: US 8,700,798 B2
(45) Date of Patent: Apr. 15, 2014

(54) SYSTEM AND METHOD FOR PROVIDING UNIVERSAL 'FOLLOW-ME' FUNCTIONALITY IN A UPNP AV NETWORK

(75) Inventors: Hendrikus G. Van Horck, Eindhoven (NL); Paul Schenk, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 549 days.

(21) Appl. No.: 11/817,503

(22) PCT Filed: Feb. 23, 2006

(86) PCT No.: PCT/IB2006/050587
§ 371 (c)(1),
(2), (4) Date: Apr. 16, 2009

(87) PCT Pub. No.: WO2006/090340
PCT Pub. Date: Aug. 31, 2006

(65) Prior Publication Data
US 2009/0216351 A1    Aug. 27, 2009

Related U.S. Application Data

(60) Provisional application No. 60/657,157, filed on Feb. 28, 2005.

(51) Int. Cl.
*G06F 15/16* (2006.01)
(52) U.S. Cl.
USPC ........... 709/232; 709/204; 709/234; 709/229; 700/94
(58) Field of Classification Search
USPC .............................. 709/232, 204, 234; 700/94
See application file for complete search history.

(56) References Cited

U.S. PATENT DOCUMENTS

| 6,725,281 | B1 | 4/2004 | Zintel et al. |
| 2003/0236895 | A1* | 12/2003 | Ohkubo et al. ............... 709/229 |
| 2004/0003073 | A1 | 1/2004 | Kryzanowski et al. |
| 2004/0243694 | A1 | 12/2004 | Weast |
| 2006/0041596 | A1* | 2/2006 | Stirbu et al. ................... 707/200 |

FOREIGN PATENT DOCUMENTS

| JP | 2004336310 A | 11/2004 |
| WO | 03107597 A1 | 12/2003 |
| WO | WO 03107597 A1 * | 12/2003 |
| WO | 2004/043043 A1 | 5/2004 |
| WO | 2004090753 A1 | 10/2004 |
| WO | 2005002139 A1 | 1/2005 |

OTHER PUBLICATIONS

Microsoft Corporation: ContentDirectory:1 Service Template Version 1.01 for Universal Plug and Play, VERSION1.0, Standardized DCP, Jun. 25, 2002, 89 Page Document.
Rasheed et al: "High-Quality Media Distribution in the Digital Home"; Intel Technology Journal, vol. 6, Issue 4, Nov. 15, 2001, pp. 17-29.

* cited by examiner

*Primary Examiner* — Kyung H Shin

(57) ABSTRACT

A system and method is provided for extending the capabilities of an UPnP AV network architecture with "Universal Follow-me" functionality to provide users of such networks with a capability to pause or stop the playing of media content at one location in the UPnP AV network (100, 700) and resume the playing of the media content at a later point in time at a different or the same location without loss of continuity.

10 Claims, 9 Drawing Sheets

US 8,700,798 B2

SYSTEM AND METHOD FOR PROVIDING UNIVERSAL 'FOLLOW-ME' FUNCTIONALITY IN A UPNP AV NETWORK

The present invention relates to a system and method for extending the capabilities of an UPnP AV network by providing a Universal follow-me functionality.

Many types of consumer electronic and personal computing equipment are currently available to the consumer. Conventionally, most of this equipment operates in a standalone mode that does not allow for interaction with other equipment. It is desired to network this equipment so that certain resources may be shared there-between.

In view of the foregoing, network protocols that provide discoverable services have been proposed. One such protocol, Universal Plug and Play (UPnP), has been defined by companies and individuals comprising the UPnP Forum. UPnP is designed to provide automatic discovery and seamless usage of services offered by many different types of networked equipment. More particularly, one piece of equipment may use UPnP to dynamically join a network, obtain an IP address, convey its capabilities, determine the capabilities of other equipment on the network, and access the capabilities of other equipment. The Universal Plug and Play (UPnP) standard is designed to enable simple and robust connectivity among stand-alone devices and personal computers (PCs) from many different vendors. Devices can subsequently communicate with each other directly, thereby enabling discovery and control of devices. UPnP uses standard Transmission Control Protocol/Internet Protocol (TCP/IP) and UDP protocols which facilitate interoperability with existing networks.

One feature not currently available in the UPnP network protocol is a "universal-follow-me" functionality which provides a capability for a user to take any media activity around with him or her in a residential or non-residential setting that offers the preconditions for it. A media activity can represent a specific kind of "task" a user wants to execute, for example, watching a TV broadcast, listening to music, watching a video or having a video communication. For example, a end user/viewer may wish to watch a TV broadcast in multiples rooms of a home whose devices operate in accordance with the UPnP network protocol, without loss of continuity as the end user/viewer moves from room to room. As long as there is an appropriate rendering device in the various rooms where the activity is to take place, thus satisfying the necessary technical pre-condition, then the TV broadcast may be viewed in multiple rooms without loss of continuity.

It would therefore be desirable to extend the current capabilities of UPnP AV networks with "Universal follow-me" functionality to provide users of such networks with the freedom to pause or stop the playing of content at one location in the UPnP AV network to be resumed at a later point in time at a different or the same location without loss of continuity.

A system and method is provided for extending the capabilities of an UPnP AV network architecture with "Universal Follow-me" functionality. Such functionality provide users of the UPnP network with a capability to pause or stop the playing of media content at one location in the UPnP AV network and resume the playing of the media content at a later point in time at a different or the same location in the network without loss of continuity.

According to one aspect, a method for providing "Universal follow-me" functionality in an UPnP AV network comprises the acts of: (a) storing metadata in a media server's UPnP content directory service (CDS) in response to the occurrence of a first AVT flow control event in the network, said first AVT flow control event corresponding to recently played media content; (b) storing first additional metadata in the CDS in response to the occurrence of a second AVT flow control event in the network, said second AVT flow control event corresponding to one of stopping or pausing the recently played media content; and (c) utilizing the first additional metadata stored in the media server's CDS to resume playing the media content.

According to another aspect, the method preferably further includes the act of storing second additional metadata in response to the occurrence of a third AVT flow control event in the network, the third AVT flow control event corresponding to the completion of the streaming of the media content from the media server over the network. The second additional metadata would provide an indication that to the media server that the media content has been completely streamed from the server and therefore becomes a candidate for deletion at some point in accordance with pre-established deletion criteria. The deletion criteria can be selected and may include a time-threshold, a completely played-threshold or other criteria such as, for example, simply the number of entries in the recently played list.

According to another aspect of the invention, a system for providing "Universal follow-me" functionality in an UPnP AV network comprises adding a specially crafted directory tree to a media server's UPnP content directory service (CDS). Each node in the directory tree represents metadata stored in the media server's content directory service (CDS) related to recently played media content. The various nodes may represent metadata, including, for example, the recently played media content's title, an end user's name identifying a user playing the recently played media content, source and destination rendering devices of the media content, the number of bytes streamed to a destination device prior to the media content being paused or stopped and a date/time when the media content was last accessed. The selection and arrangement of nodes for use in the directory tree is highly user configurable and may be adapted to each application.

The present invention provides a server based solution for incorporating "Universal follow-me" functionality in an UPnP AV network. Specifically, whenever an AVT flow control event occurs in the network, the metadata corresponding with the recently played list in a media server's UPnP content directory service (CDS) is updated. The metadata is presented by the CDS to UPnP Control Points and UPnP AV devices upon request as a standard feature of the UPnP AV protocol. As such, the UPnP Control Points and UPnP AV devices are free from having to track and retain any knowledge of the recently played objects as they occur. Instead, the UPnP Control Points and UPnP AV devices can advantageously access the media server's CDS to retrieve the metadata as needed to access Universal follow-me functionality in the network.

The foregoing features of the present invention will become more readily apparent and may be understood by referring to the following detailed description of an illustrative embodiment of the present invention, taken in conjunction with the accompanying drawings, where FIG. 1 is a view showing an environment where the invention may be utilized;

Figure 1:
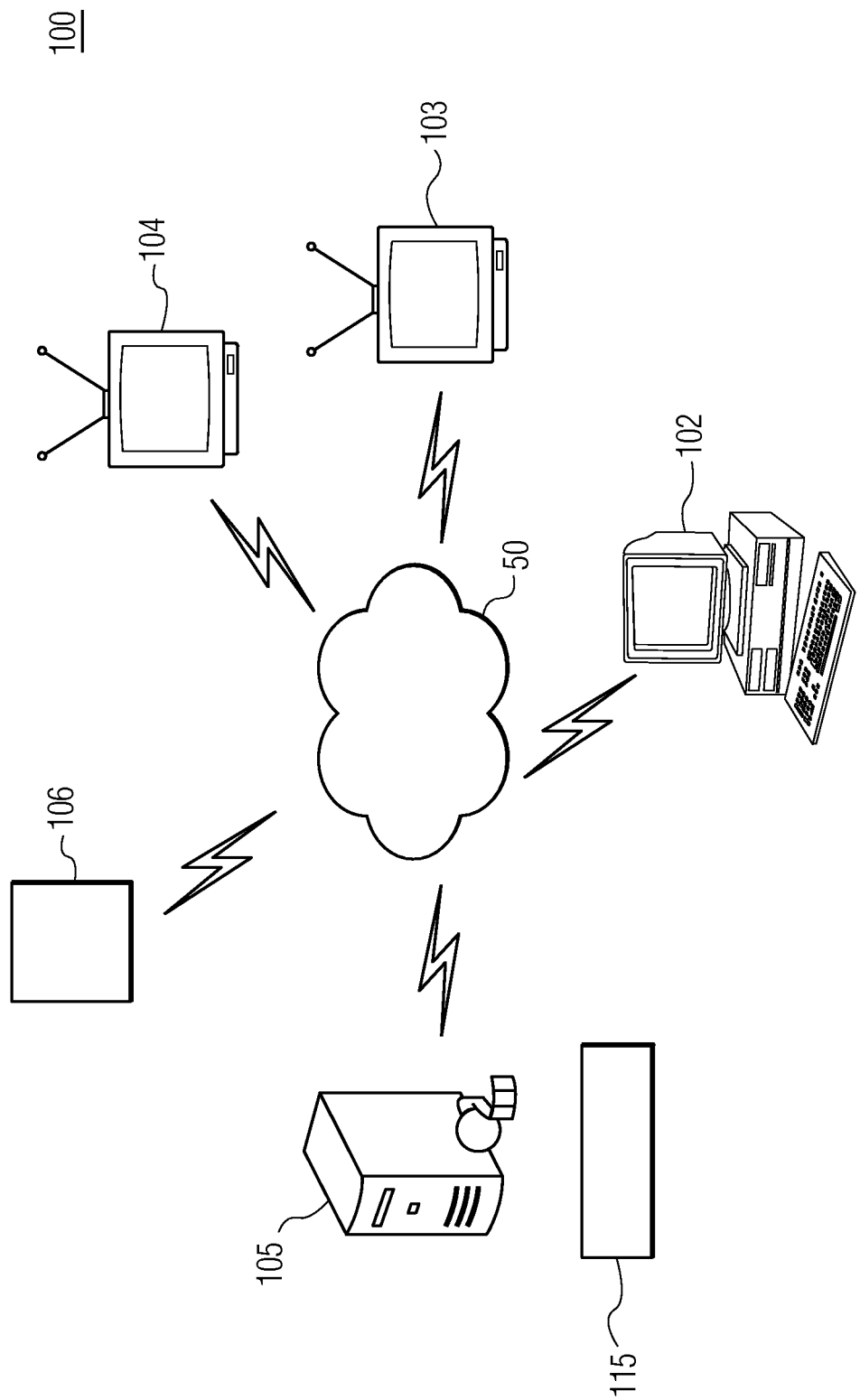

Although the following detailed description contains many specifics for the purpose of illustration, one of ordinary skill in the art will appreciate that many variations and alterations to the following description are within the scope of the invention. Accordingly, the following preferred embodiment of the invention is set forth without any loss of generality to, and without imposing limitations upon, the claimed invention Components and operation of a network are described below in terms of the UPnP protocol. However, some embodiments may be implemented with other components and/or network protocols.

The remainder of the detailed description is organized in the following manner.

First, an overview of the principles of a method for extending the capabilities of an UPnP AV network architecture with "Universal Follow-me" functionality is provided.

Second, a brief review of some basic principles of the UPnP AV architecture is provided.

Third, a detailed description of a system in which the method of the invention may be practices, according to one embodiment, is provided.

Fourth, an overview of operational steps in flow diagram form, of a method for enhancing an UPnP AV network with Universal follow-me functionality is provided.

Fifth, an example directory tree of the media server's UPnP content directory service (CDS) with hierarchically arranged nodes that is presented to and accessible by end users/end user/viewers is provided.

Sixth, an example is provided of a residential environment in which the system and method of the invention may be implemented.

I. OVERVIEW

The invention provides a server side solution for implementing "Universal follow-me" functionality in a UPnP AV network. The "Universal follow-me" functionality provides end users with a capability to pause or stop the playing of media content at one location in the UPnP AV network and resume playing the media content at the same or at a different location without loss of continuity.

In operation, whenever an AVT flow control operation occurs in a UPnP AV network, associated with recently played media content, metadata corresponding to the flow control event is stored in the CDS of one or more media servers in the network. The media server(s) create CDS objects from the stored metadata as representations of the underlying (stored) metadata. Universal follow-me functionality is enabled by virtue of the various UPnP Control Points accessing the stored metadata at the media server upon request as needed to resume play of the media content without loss of continuity. The UPnP control points access the stored metadata through the well known "advertising" feature provided by the media server in which the media server advertises all of its content, including the stored metadata, to all of the UPnP clients in the network (i.e., the UPnP Control Points and UPnP AV devices).

Follow-me functionality is provided as a server side solution that is universal in the sense that there is no requirement on the part of the UPnP Control Points and UPnP AV devices to track the various AV flow control events related to the recently played media content as they occur. Instead, by virtue of storing all relevant metadata at the media server as it occurs, the media server stores all of the relevant data to carry out the follow me functionality feature. Advantageously, the relevant data is accessible to the UPnP Control Points in the network via the well known "advertisement" feature. In this regard, the UPnP Control Points and UPnP AV devices in the network do not require modification to implement the "Universal follow-me" functionality. As such, the UPnP Control Points and UPnP AV devices can be selected for use in the network without regard to manufacturer or model type thus providing a "Universal" solution.

According to an aspect of the invention, control points are able to access a specially crafted directory tree advertised by the media server's UPnP content directory service (CDS). Each node can be thought of as a representation to the end users of portions of the underlying stored metadata corresponding to the AVT flow control events with regard to the recently played media content. For example, one directory tree node may represent underlying metadata related to the title of recently played media content (e.g., "Star Wars"). Another directory tree node may represent underlying metadata related to a rendering device on which the recently played media content's is played. Other examples are provided throughout the specification.

It should be appreciated that the directory tree structure is highly user configurable to include only those nodes representing metadata of interest for a particular application. Moreover, the selected nodes may be structured (arranged) in a hierarchical configuration best suited to an end user's needs for a particular application.

II. UPnP ARCHITECTURE

It is instructive to first briefly review some basic principles of the UPnP AV architecture, such as the one illustrated in FIG. 1. For a more detailed explanation of the UPnP AV architecture, reference is made to "UPnP AV architecture V 0.83".

Generally, the UPnP AV architecture defines the general interaction between UPnP AV devices. The AV architecture is independent of any particular device type, content format and transfer protocol. It supports an ever growing variety of devices such as TV's, VCR's, CD/DVD players/jukeboxes, set top boxes, stereo systems, MP3 players, still image cameras, camcorders, electronic picture frames (EPFs), and the PC. The UPnP AV architecture allows devices to support different types of formats for the entertainment content (such as MPEG2, MPEG4, JPEG, MP3, Windows Media Audio (WMA), bitmaps (BMP), etc.) and multiple types of transfer protocols (such as—HTTP GET, RT(S)P, HTTP, PUT/POST, TCP/IP, etc.).

Most AV scenarios involve the flow of (entertainment) content (i.e., a movie, song, picture, etc.) from one UPnP AV device to another. An AV Control Point interacts with two or more UPnP devices acting as source and sink, respectively. Although the Control Point coordinates and synchronizes the behavior of both devices, the devices themselves interact with each other using an ("out-of-band") communication protocol. The AV Control Point uses UPnP to initialize and configure both devices so that the desired content is transferred from one device to the other. However, since the content is transferred using an "out-of-band" transfer protocol, the AV Control Point is not directly involved in the actual transfer of the content. The AV Control Point configures the devices as needed, triggers the flow of content and then gets out of the way. As described, three distinct entities are involved: the Control Point, the source of the media content (called the "MediaServer"), and the sink for the content (called the "MediaRenderer"). As is well known, many MediaRenderers may also include Control Point functionality. In the embodiments described herein, it is assumed that the various MediaRenderers include such Control Point functionality.

III. SYSTEM EMBODIMENT

FIG. 1 is an illustration of an exemplary network structured in accordance with the UPnP AV architecture 100. The environment shown in FIG. 1 may be located, for example, within a home, and the devices may be provided by several different vendors. The UPnP AV devices shown in FIG. 1 include a personal computer 102, a first television 103, a second television 104, a media server 105, and an audio system 106. Other devices and/or applications can also be included as a system component. Within the network of FIG. 1, the media server 105 includes a content directory service (CDS) 115.

Network 50 provides communication means between the various devices shown. Network 50 may comprise any number of different systems for transferring data, including a Local Area Network (LAN), a proprietary network, a Wireless Application Protocol (WAP) network, a wireless LAN, a Bluetooth network and the like.

IV. FLOW DIAGRAM

Figure 2:
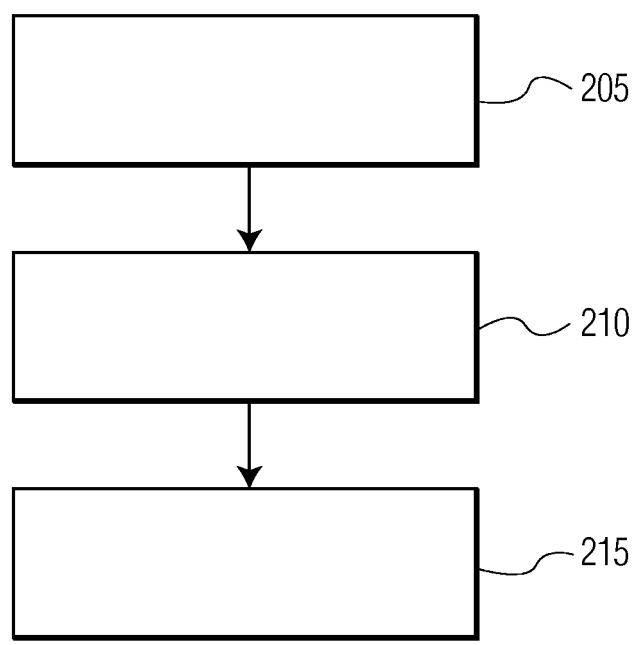
FIG. 2 is a flowchart of an embodiment of a method of the invention for enhancing an UPnP AV network with Universal Follow me functionality.

Referring now to FIG. 2, there is shown an overview of operational steps in flow diagram form, of a method for enhancing an UPnP AV network with Universal follow-me functionality according to one embodiment, the method comprising the acts of:

Act 205—Media content is rendered on a first rendering device at a first location in the UPnP AV network in response to an end user/end user/viewer request. This act conforms with standard UPnP operations, as will be described below with reference to the more detailed flowchart of FIG. 3.

Act 210—The end user/viewer pauses or stops playing the media content currently being played on the first rendering device. This act encompasses acts which conform with standard UPnP operations and acts which conform with the method of the invention, as will be described below with reference to the more detailed flowchart of FIG. 4.

Act 215—The end user/viewer resumes playing the media content on a second rendering device at a second location in the UPnP AV network, without loss of continuity. It should be appreciated that the method also applies to the case where the end user/viewer decides to resume play of the media content on the first rendering device at the first location. Generally, the method implements the Universal follow-me functionality in such a way to allow an end user/viewer to resume play of the media content on any rendering device in the UPnP network configured to render such content.

Figure 3:
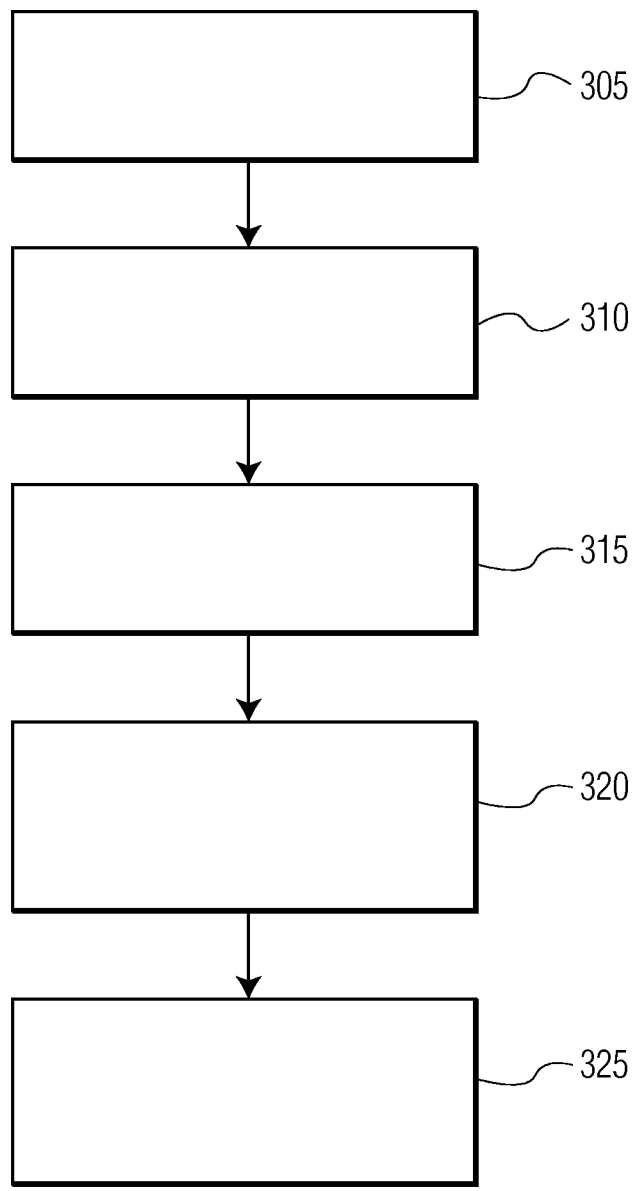
FIG. 3 is a more detailed flowchart of act 205 of FIG. 2.

Referring now to FIG. 3, which is a more detailed flowchart of act 205 of FIG. 2

Act 305—a control point (CP) associated with, or alternatively embedded within the first rendering device, commands the first rendering device to begin playing the media content requested by the end user/viewer. The CP supplies the first rendering device with the correct URI for locating the requested media content in the UPnP network (i.e., the URI corresponds to the address of a media server storing the media content). This act conforms to standard UPnP operations. It should be understood that in accordance with the UPnP protocol, the CP may alternatively inform the media server storing the media content directly to begin playing the media content requested by the end user/viewer. This act conforms with standard UPnP operations.

Act 310—Using the URI transmitted from the CP, the first rendering device issues a request to the media server storing the media content to begin streaming the media content. Standard protocols, such as HTTP, RTP, etc. may be used by the first rendering device to issue the request. Act 310 conforms to standard UPnP operations.

Act 315—In response to the request, the media server storing the media content, starts streaming the requested media content to the first rendering device. Act 315 conforms to standard UPnP operations.

Act 320—Substantially simultaneous with act 315 above, the media server writes (stores) meta-data in its CDS, corresponding to the requested media content being streamed to the first rendering device. The meta-data written to the CDS of the media server at this point includes at least a media content identifier, (i.e., the media content's uniform resource identifier (URI)) and the media content destination (i.e., the rendering device on which the media content is to be played). Act 320 is performed in accordance with the principles of the invention.

Act 325—The meta-data written to the CDS is presented by the media server to end users of the network in a specially crafted directory tree appended to the media server's UPnP content directory service (CDS). It should be understood that the metadata, once written to the CDS becomes immediately available to control points and UPnP devices in the UPnP AV network upon request in accordance with the standard "advertisement" feature provided in accordance with the UPnP protocol. Act 325 is performed in accordance with the principles of the invention.

Figure 4:
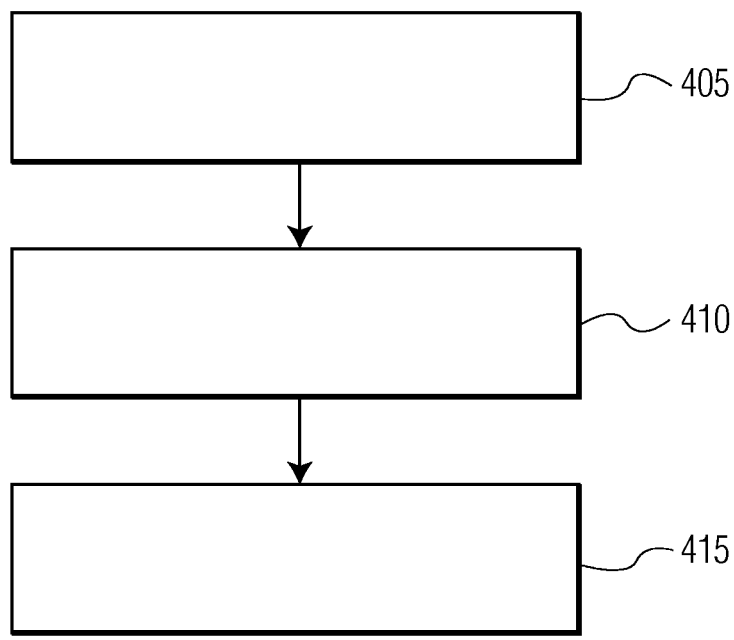
FIG. 4 is a more detailed flowchart of act 210 of FIG. 2.

Referring now to FIG. 4, which is a more detailed flowchart of act 210 of FIG. 2.

Act 405—a control point, associated with, or embedded within, the first rendering device commands the first rendering device to stop displaying the content. This act conforms to standard UPnP operations.

Act 410—the first rendering device communicates with the media server to inform the media server to stop streaming the media content. The first rendering device then breaks the connection. This act conforms to standard UPnP operations.

Act 415—the media server is now aware that it is no longer streaming the media content and updates the CDS with additional meta-data to be stored therein Specifically, the additional meta-data written to the CDS at this point includes at least the number of bytes of the media content already transmitted to the first rendering device. It should be understood, however, that the meta-data written to the CDS at this point could also include, for example, one or more of the following: the media content's title, the media content's URI, a username identifying an end user playing the media content, the source and/or destination rendering device and a date&time when the media content was last accessed. It should be appreciated that other types of metadata than the types explicitly recited herein may also be written to the CDS.

Figure 5:
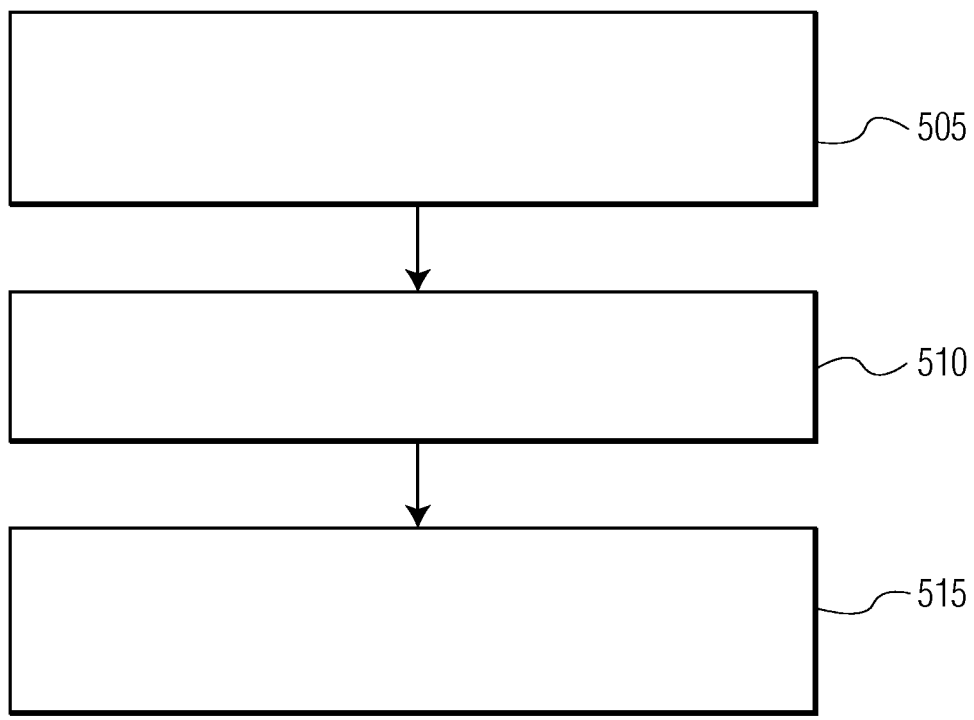
FIG. 5 is a more detailed flowchart of act 215 of FIG. 2.

Referring now to FIG. 5, which is a more detailed flowchart of act 215 of FIG. 2.

Act 505—the control point (CP) associated with, or embedded within, the second rendering device, accesses the CDS at the media server.

Act 510—the media server sends the CDS objects to the requesting CP in response to the request at act 505, thereby also sending the specially crafted part of the CDS structure containing the recently played list.

Act 515—the CP uses the CDS entry representing the metadata returned from the media server to resume playing the media content at the second (or any other) rendering device in the UPnP AV network.

V. DIRECTORY TREE

Figure 6:
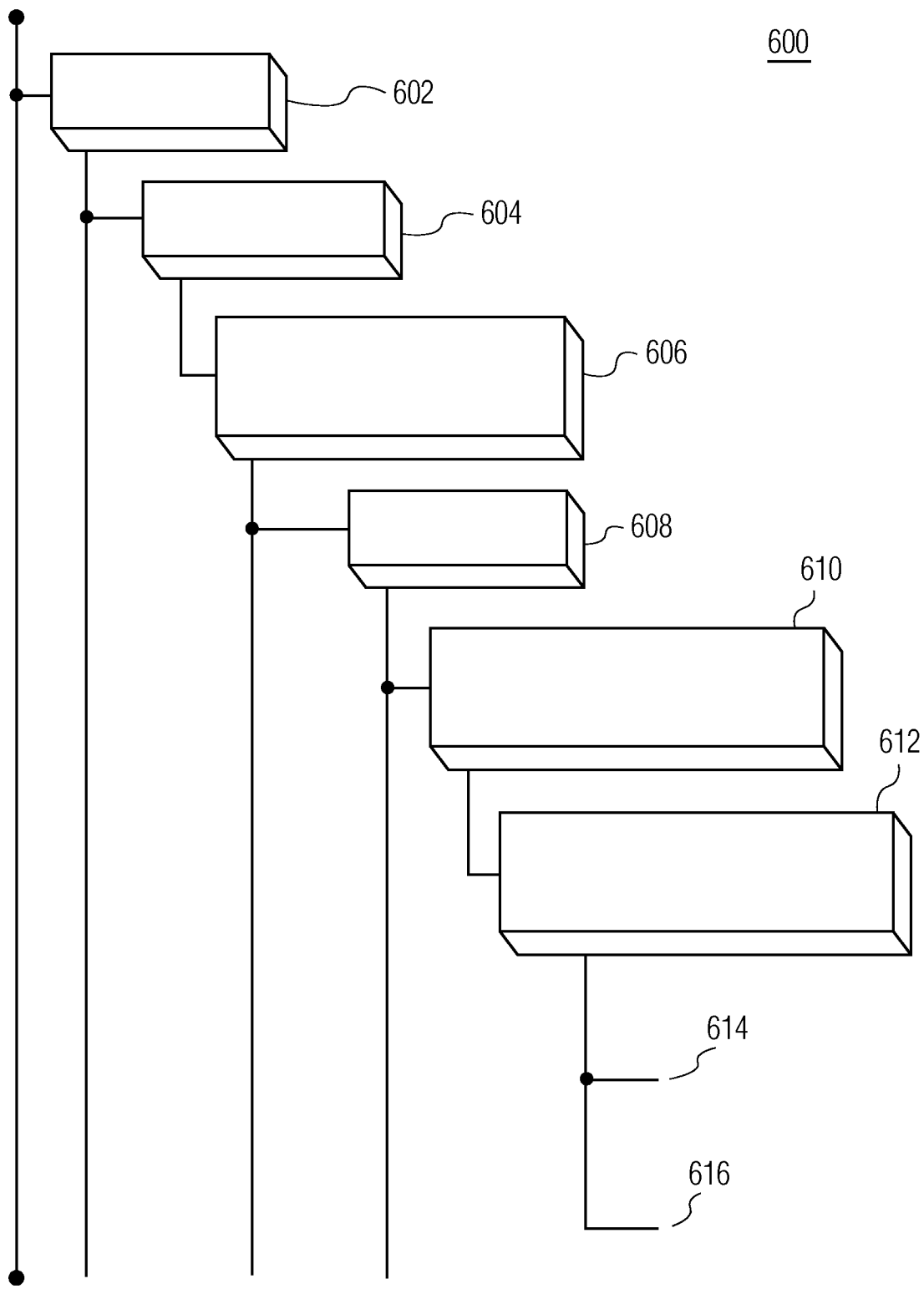
FIG. 6 is an illustration of an exemplary directory tree of the media server's UPnP content directory service (CDS) for display to end users.

FIG. 6 illustrates an example directory tree 600 of a media server's UPnP content directory service (CDS) with hierarchically arranged nodes that may be accessed by end users/viewers of a UPnP network. The tree 600 is shown with root node 602 at the top of the hierarchy. The root node 602 representing the CDS root class node 602. The tree 600 represents one exemplary user configured logical view of the metadata stored in the media server's content directory service (CDS). It should be understood that the organization and selection of particular nodes in the tree 600 is highly user configurable allowing the user to select only those nodes of interest and arrange the selected nodes in an order of the user's choosing. Moreover, an end user may construct multiple directory trees for a particular application in accordance with the end user's preferences. For example, for those applications where there is a single end user and a single media server (i.e., source device) then a node pertaining to multiple end users 606 and multiple source devices 608 are not needed and can be excluded from the directory tree 600. It is further contemplated that the end user can select from any number of user configured directory trees using search criteria which may be incorporated into the various control points in the network.

The exemplary directory tree 600 of FIG. 6 is shown to include seven nodes beneath the CDS root (parent) node 602, the nodes are labeled: "recently played" 606, a "username" 606, "title-A" 608, "source-device" 610, "destination-device" 612, "resume task" 614 and "replay task" 616. The seven nodes present one logical view of the metadata stored in the content directory service (CDS).

Each node represents a particular type of metadata corresponding to recently played media content. The nodes illustrated in the directory tree 600 and described below, are not meant to be exhaustive but merely provided as one example of the types of metadata that can be stored in the CDS. It is to be appreciated that other types of metadata may be represented by nodes in the tree 600 other than those described below. The types of metadata represented by each of the nodes of the exemplary directory tree 600 are now described as follows:

Recently Played Node 604

This node will typically always be used in an application. It is the starting point of the recently played list and will help users to quickly locate the recently played files. This is also the beginning of the specially crafted part of the CDS.

Username Node 606

Some applications include multiple end users, where each end user is capable, at any time, of playing, pausing, stopping, re-starting content on any of the rendering devices in the UPnP AV network. For these applications, the Username node 206 can represent the metadata to identify each of the multiple end users.

Source Device Node 610

The source device node 610 represents metadata identifying the device or devices that store content (e.g., audio, video, multimedia). Typically, most UPnP AV networks will include several source devices. Such is not the case in the network of FIG. 1 which includes media server 105 as the sole source device. This node 610 is only useful in those situations where the UPnP AV network includes multiple source devices (e.g., media servers) to distinguish what content is being stored on each of the respective servers. It is especially useful if there is an aggregated view of the network available.

Destination Device Node 612

The destination device node 612 represents meta-data identifying the device upon which content was last rendered.

Title Node 608

In most applications, the UPnP AV network includes more than one title (i.e., media file). The Title node 608 represents a title list identifying the multiple titles being rendered in the UPnP network.

Resume Task Leaf Node 614

At the point in time when an end user pauses or stops playing media content at a first location, the number of bytes streamed to that point is written as meta-data to the CDS. The resume task leaf node 614 represents metadata indicating the number of bytes streamed to that point in time. This leaf node provides the media server with information to resume playing the content at substantially the same point at which it was paused or stopped. It should be appreciated, however, that given the practical limitations of the buffers and protocols used, the accuracy of re-starting the content at precisely the point at which it was paused is limited. However, the inventors recognize that by taking some form of buffering into account, the accuracy can be improved.

Replay Task Leaf Node 616

It may be desirable in certain situations to view media content from its starting point rather than at a point at which the content was paused or stopped. The start point of recently played media content is represented by the Replay Task leaf node 616 to give the end user to option to start playing the media content from the beginning.

VI. EXAMPLE

Figure 7:
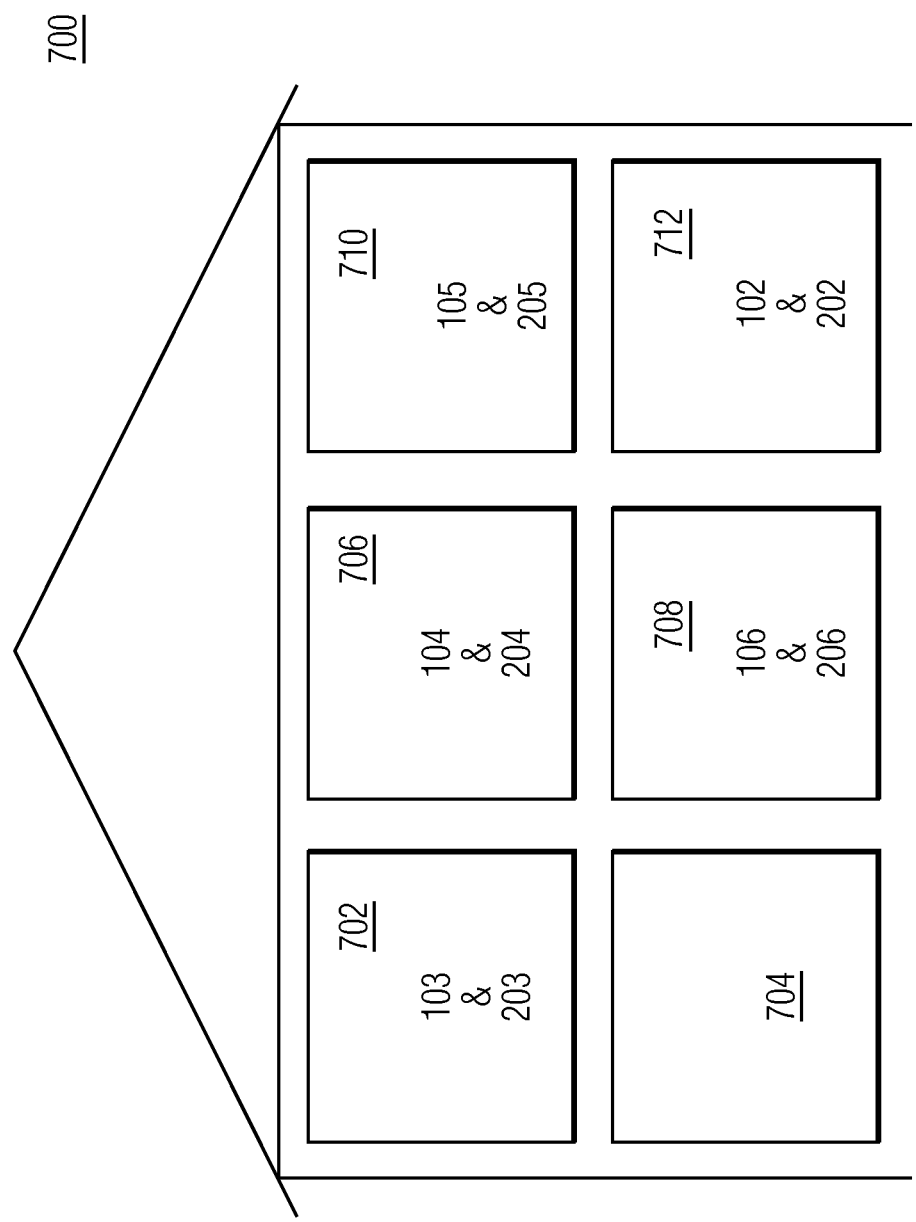
FIG. 7 illustrates an exemplary residential environment in which the system and method of the invention may be implemented.

FIG. 7 illustrates an exemplary residential environment in which the system and method of the invention may be implemented. The exemplary residence includes a number of rooms including a kitchen 702, dining room 704, living room 706, den 708 a study 710 and a bedroom 712. In each room there is shown one or more media devices. A television 103 and associated control point 203 is located in the kitchen 702, a television 104 and associated control point 204 is located in the living room 706, an audio system 106 and associated control point 206 is located in the den 708, a media server 105 and associated control point 205 is located in the study 710 and a PC 102 and associated control point 102 is located in the bedroom 712.

Figure 8:
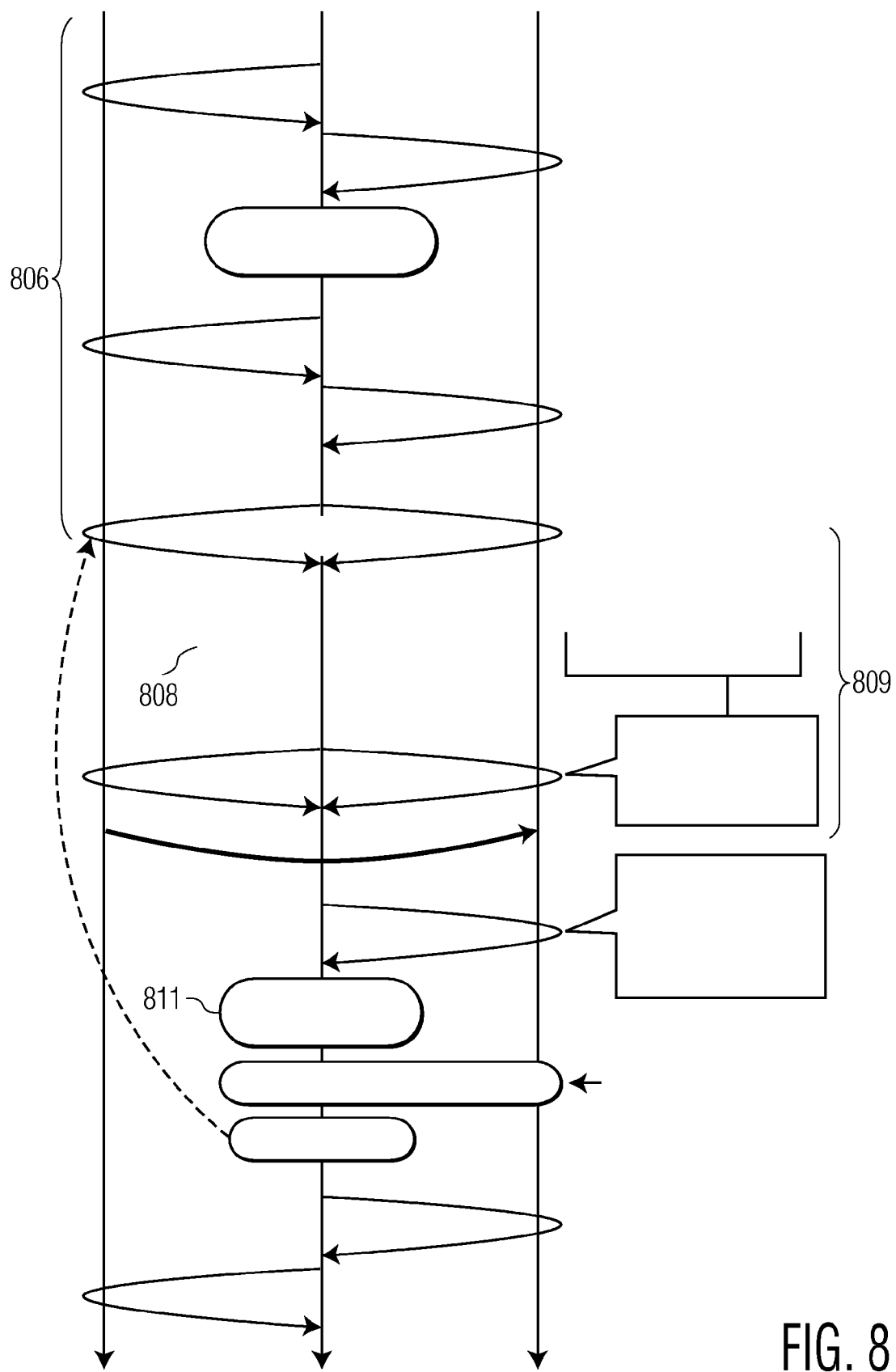
FIG. 8 is a sequence diagram which illustrates the operations performed by the control point (CP), the media server and the media renderer.

The instant example further illustrates the operational steps of the flowchart of FIG. 2, and the actions performed in the sequence diagram of FIG. 8.

Example Overview

In the instant example, it is assumed that an end user/viewer starts watching a movie (movie-A) on TV 103 in the kitchen 702 while cooking. This constitutes the rendering of media content (movie-A) on a first rendering device (kitchen TV 103) at a first location (kitchen 702). It is assumed that at some point in time, at the choosing of the end user/viewer, the end user/viewer decides to pause movie-A on the TV 103 in the kitchen 702. The end user/viewer then decides he or she would prefer to continue (resume) watching movie-A in the living room 406 on TV 104. This constitutes resumption of playing of the media content (movie-A) at a second or different location from where the movie (movie-A) was started (kitchen 702). The ability to pause movie-A in the kitchen and resume the playing of movie-A in the living room at the point at which the move was paused without loss of continuity is an exemplary illustration of the principles of the invention for providing Universal Follow-me functionality in a UPnP AV network.

EXAMPLE

Part 1

The first part of the description pertains to act 205 of FIG. 2 which recites: Media content is rendered on a first rendering device at a first location in the UPnP AV network in response to an end user/viewer request.

To start watching movie-A on kitchen TV 103 in the kitchen 702, the end user/viewer utilizes a control point (CP) 203 to find movie listings. Control point (CP) 203 could be embedded within kitchen TV 103, or could be a separate CP. In either case, it selects kitchen TV 103 as its rendering device. In this example it is assumed that the CP 203 is embedded in the kitchen TV, and as such will use its display capabilities. It is also assumed that a remote control is used to control CP 203. CP 203 will send a request to a media server 105 to receive a content list (movie listing) stored there. Upon receiving the request from the CP 203 for the content list at the media server 105, the media server 105 provides the content list to the CP 203 to be browsed by the end user/viewer.

Next, the end user/viewer makes a selection from the content list displayed on kitchen TV 103. The end user/viewer selection is transmitted to CP 203 which commands the kitchen TV 103 to start playing the end user/viewer selection by providing the kitchen TV 103 with the correct URI to retrieve the end user/viewer selected content. The kitchen TV 103, using the correct URI, requests the appropriate content from the media server 105. Upon receiving the request, including the correct URI, the media server 105 streams the appropriate content to the kitchen TV 103. Protocols for performing this audiovisual data transfer can be in accordance with any well known data transfer protocol such as HTTP, RTP and is commonly referred to as out-of-band content transfer.

Up to this point, the actions described are conventional UPnP operations which conform to the UPnP protocol. Further, the above actions are generally referred to in the sequence diagram of FIG. 8 as 806.

As the media server 105 starts communicating with the kitchen TV 103, one or more supplemental actions are performed in accordance with the principles of the invention. These supplemental actions occur substantially in parallel with the conventional actions performed in accordance with standard UPnP protocol.

These supplemental actions involve: (1) storing metadata, to be described below, in the content directory service (CDS) of the media server 105; and (2) creating CDS objects at the media server 105 to represent the metadata stored in the CDS.

Further, in accordance with the UPnP standard, the CDS notifies the UPnP network of its update. It should be understood that the CDS objects created at the media server 105 make the stored metadata available to control points (CPs) in the UPnP network upon request. The act of storing the metadata in the CDS of the media server 105 is referred to in the sequence diagram of FIG. 8, as:

"First Supplemental Action: Store metadata in CDS" labeled 808.

The stored metadata written to the CDS of the media server 105 at this point comprises a URI of the media content being streamed (e.g., movie-A), or a reference to the media content (movie-A) streamed by the media server 105 to the kitchen TV 103, and the identity of the media rendering device (i.e., the kitchen TV 103) displaying the media content (movie-A) at the first location (i.e., the kitchen 702). The identity can be stored as an ID and/or a user friendly label such as "kitchen TV".

Figure 9:
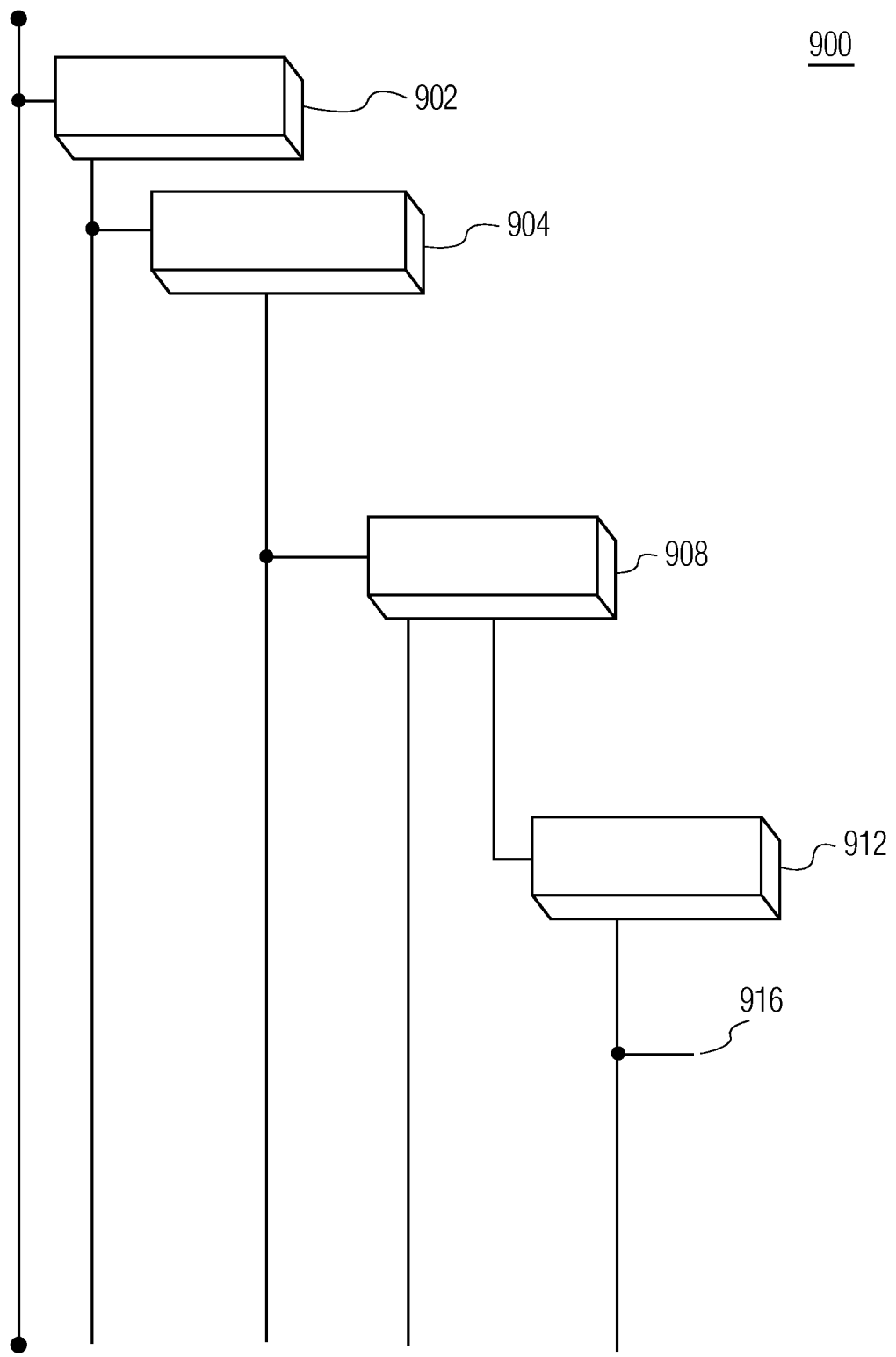
FIGS. 9-10 illustrate exemplary views of the directory tree for the example of FIG. 7.

FIG. 9 is a view of a directory tree 900 at substantially the point in time when the first supplemental action occurs (see FIG. 8, 808). Once the CDS metadata gets updated, the CDS at the media server 105 will update its content and tell the UPnP network it has been updated. As shown, the directory tree 900 of FIG. 9 provides a logical view of all of the metadata written to the CDS thus far. This includes an entry made in the "TITLE" node 908 (i.e., "movie-A").

The astute reader will recognize that the directory tree 900 of FIG. 9 does not include a source device node because there is only a single media server in the UPnP network illustrated in FIG. 7, i.e., media server 105.

Part 2

The second part of the description pertains to act 210 of FIG. 2 which recites: The end user/viewer pauses or stops playing the media content currently being played on the first rendering device.

The media server 105 that was up to this point in time, streaming movie-A to the kitchen TV 103 (i.e., the first media rendering device) now receives a "pause" or "stop" command via a remote control or similar device from the end user/viewer. In response, CP 203 commands the media server 105 to stop streaming movie-A to the kitchen TV 103 and breaks the connection. It is noted that these actions are performed in conformance with standard UPnP protocol.

At this point, the media server 105 is aware that it is no longer streaming movie-A and updates the CDS by storing additional metadata related to the AVT flow control "pause" or "Stop" event. The act of pausing or stopping the play of movie-A constitutes a second AVT flow control event related to the recently played media content. This second AVT flow control event is labeled 809 and illustrated in the sequence diagram at FIG. 8 as:

"Second Supplemental Action—On any AVT flow control operation, update CDS with additional metadata".

At this point, additional metadata is stored in the media server's CDS comprising at least the amount of bytes send to the kitchen TV 103 prior to the pause or stop operation. In addition to storing the destination device, the date&time that the media content was stopped, the end user identity and/or other metadata could be stored.

which is updated to reflect the additional metadata written to the CDS at substantially the point in time at which movie-A was paused or stopped.

The additional metadata written to the CDS is represented in the directory tree 900 as (1) a new entry made in the "RECENTLY PLAYED" node 904 i.e., "Movie-A and (2) a new entry in the "DESTINATION DEVICE" node 912 (i.e., "kitchen TV 103").

Part 3

The third part of the description corresponds to Act 215 of FIG. 2 which recites: The end user/end user/viewer resumes playing the media content on a second rendering device at a second location in the UPnP AV network, without loss of continuity. It should be understood that the second rendering device includes any rendering device in the network suited to play the media content, including the first rendering device where the media content was started.

The end user/viewer now moves into the living room to resume playing movie-A on TV 104. To do so, the end user/viewer may be shown, via control point 204, the directory tree 900 of FIG. 10 provided by the media-server 105 to locate movie-A.

Figure 10:
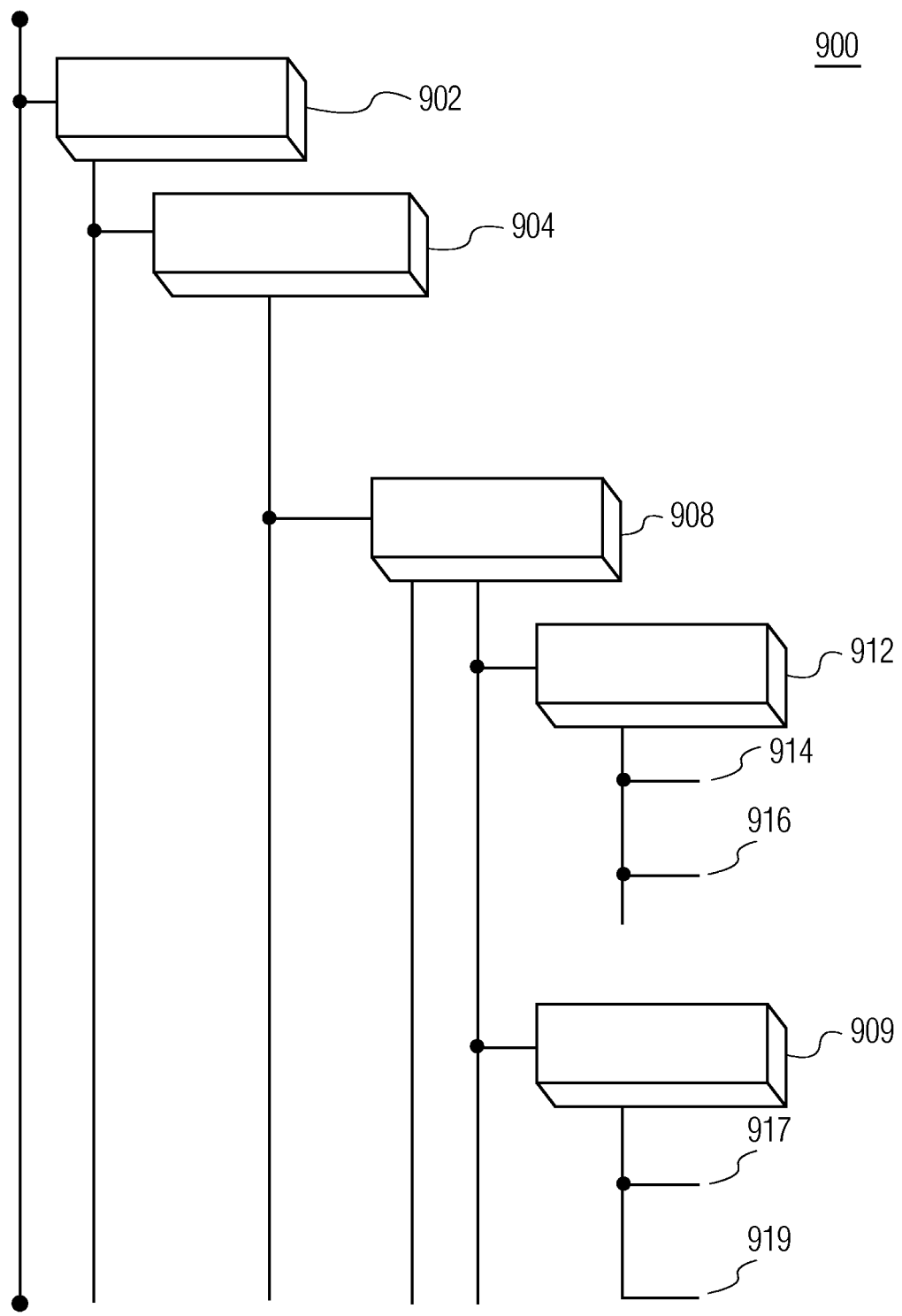

FIG. 10 is a view of the directory tree 900 at substantially the point in time when movie-A is being streamed to the living room TV 104. As shown, a new destination device node 909 is included in the directory tree 900 including associated resume task 917 and replay task 919 leaf nodes.

The end user/viewer navigates through the displayed directory tree 900 of FIG. 10 to locate movie-A in the recently played part of the CDS. Specifically, the end user/viewer navigates through the directory tree 900 of FIG. 10 to locate movie-A as an entry of the Title node 908. The display of the directory tree 900 of FIG. 10 and selection of movie-A is controlled by CP 204, the control point controlling the living room TV 104.

In response to the end user/viewer selection of movie-A, CP 204 translates the request and forwards the request to the media server 105 to access movie-A. In response to the request made by CP 204 for movie-A, the media server 105 starts streaming movie-A to the living room TV 104. Using the already written CDS metadata (i.e., the amount of bytes send to the kitchen TV 103 prior to the pause or stop operation), the media server 105 is able to start streaming at the point where the previous session was stopped. These acts are recited, in general terms in the flowchart of FIG. 5 (acts 505-515) which is a more detailed flowchart of act 215 of the flowchart of FIG. 2.

At the point in time at which the end user/viewer finishes watching movie-A on the living room TV 104, a third supplemental action occurs which is not performed in accordance with standard UPnP protocol. The third supplemental action is described with reference to the sequence diagram of FIG. 8, labeled as 811 and identified as:

Third Supplemental Action—"Update CDS metadata"

This third supplemental action refers to additional metadata written to the CDS of the media server 105 indicating that movie-A has been streamed in its entirety from the media server 105 to the renderer (e.g., the living room TV 104). In other words, the CDS of the media server 105 is updated to acknowledge the completion of the rendering of movie-A from the media server 105. Updating the CDS of the media server 105 in this way allows deletion mechanism to delete completely streamed media content from the recently played list part of the CDS of media server 105.

To update the CDS of the media server 105 upon completion of the rendering of media content, the recently completed (streamed) media content can be flagged at the media server 105. At some point, a deletion module or software routine reviews the flagged media content for deletion from the recently played part of the CDS of the media server 105 in accordance with pre-defined deletion criteria. The deletion criteria may include a time-threshold, a capacity-threshold, etc. Other deletion criteria may include, deleting one media file per user. Further, in some embodiments, such criteria may be desired to be applied to a collective behavior rather than applied on an individual basis.

Although this invention has been described with reference to particular embodiments, it will be appreciated that many variations will be resorted to without departing from the spirit and scope of this invention as set forth in the appended claims. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts is intended to be required unless specifically indicated.

The invention claimed is:

1. A method for providing Universal follow-me functionality in a Universal Plug and Play Audio/Video (UPnP AV) network, comprising the acts of:

(a) storing metadata in a media server's UPnP content directory service (CDS) in response to an occurrence of a first Audio/Video Transport (AVT) flow control event in the network, the metadata corresponding to a requested media content being streamed to a first rendering device in the network and played on the first rendering device;

(b) storing additional metadata in the media server's CDS to update the CDS in response to an occurrence of at least a second AVT flow control event in the network that relates to recently played streamed media content of act (a), the additional metadata corresponding to at least a number of bytes of the requested media content streamed to the first rendering device up to a point in time of the occurrence of the second AVT flow control event, wherein the media server (i) creates CDS objects from the stored metadata and additional metadata as external follow-me functionality representations of the stored metadata and additional metadata and (ii) crafts the created CDS objects into a follow-me functionality directory tree, having a hierarchical follow-me functionality structure for universal follow-me functionality, appended to the media server's UPnP CDS, further wherein the media server advertises all of its content, including the stored metadata and additional metadata, to all UPnP AV client devices in the UPnP AV network, the stored metadata and additional metadata being advertised via the created CDS objects in the follow-me functionality directory tree;

(c) searching, from a control point associated with another rendering device in said network, the created CDS objects in the follow-me functionality directory tree as the external follow-me functionality representations of (i) said metadata and (ii) said additional metadata stored in said media server's CDS that relates to said recently played streamed media content, wherein the another rendering device includes the first rendering device or any other device in the network configured to render such content; and (d) accessing, via the control point associated with the another rendering device, said metadata and said additional metadata stored in the media server's CDS, via said created CDS objects in the follow-me functionality directory tree as the external follow-me functionality representations of (i) said metadata and (ii) said additional metadata, wherein responsive to an end user selection of a resume task created CDS object for the recently played streamed media content in the follow-me functionality directory tree, requesting, via the control point, for the media server to start streaming to resume playing said recently played streamed media content on the another rendering device at substantially a same point at which the recently played streamed media content was paused or stopped via the occurrence of the at least second AVT flow control event, wherein further said CDS objects as the external follow-me functionality representations are crafted into an additional CDS tree that comprises the follow-me functionality directory tree appended to the media server's CDS, wherein said additional CDS tree is comprised of a plurality of nodes wherein each node is an external follow-me functionality representation of at least a portion of the metadata and additional metadata stored in the media server's CDS.

2. The method of claim 1, wherein the plurality of nodes are constructed by the CDS.

3. The method of claim 1, wherein the metadata stored at the media server's CDS at act (a) comprises at least: a URI identifier of the media content; and an identifier identifying a renderer playing said media content.

4. The method of claim 1, further comprising the act of storing further additional metadata in the media server's UPnP content directory service (CDS) responsive to an occurrence of a content transfer complete AVT flow control event in the UPnP AV network, said content transfer complete AVT flow control event corresponding to a completion of streaming of the media content from the media server over the UPnP AV network.

5. The method of claim 4, further comprising the act of tagging the media content as being completely streamed upon completion of the streaming of the media content from the media server over the UPnP AV network.

6. The method according to claim 5, further comprising the act of deleting the tagged media content from a recently played section of the media server's CDS in accordance with pre-established deletion criteria.

7. A system for providing Universal follow-me functionality in a Universal Plug and Play Audio/Video (UPnP AV) network, the system comprising:
means for storing metadata in a media server's UPnP content directory service (CDS) in response to an occurrence of a first Audio/Video Transport (AVT) flow control event in the network, the metadata corresponding to a requested media content being streamed to a first rendering device in the network and played on the first rendering device;
means for storing additional metadata in the media server's CDS to update the CDS in response to an occurrence of at least a second AVT flow control event in the network that relates to recently played streamed media content, the additional metadata corresponding to at least a number of bytes of the requested media content streamed to the first rendering device up to a point in time of the occurrence of the second AVT flow control event, wherein the media server (i) creates CDS objects from the stored metadata and additional metadata as external follow-me functionality representations of the stored metadata and additional metadata and (ii) crafts the created CDS objects into a follow-me functionality directory tree, having a hierarchical follow-me functionality structure for universal follow-me functionality, appended to the media server's UPnP CDS, further wherein the media server advertises all of its content, including the stored metadata and additional metadata, to all UPnP AV client devices in the UPnP AV network, the stored metadata and additional metadata being advertised via the created CDS objects in the follow-me functionality directory tree;
means for searching, from a control point associated with another rendering device in said network, the created CDS objects in the follow-me functionality directory tree as the external follow-me functionality representations of (i) said metadata and (ii) said additional metadata stored in said media server's CDS that relates to said recently played streamed media content, wherein the another rendering device includes the first rendering device or any other device in the network configured to render such content; and
means for accessing, via the control point associated with the another rendering device, said metadata and said additional metadata stored in the media server's CDS, via said created CDS objects in the follow-me functionality directory tree as the external follow-me functionality representations of (i) said metadata and (ii) said additional metadata, wherein responsive to an end user selection of a resume task created CDS object for the recently played streamed media content in the follow-me functionality directory tree, requesting, via the control point, for the media server to start streaming to resume playing said recently played streamed media content on the another rendering device at substantially a same point at which the recently played streamed media content was paused or stopped via the occurrence of the at least second AVT flow control event, wherein further said CDS objects as the external follow-me functionality representations are crafted into an additional CDS tree that comprises the follow-me functionality directory tree appended to the media server's CDS, wherein said additional CDS tree is comprised of a plurality of nodes wherein each node is an external follow-me functionality representation of at least a portion of the metadata and additional metadata stored in the media server's CDS.

8. The system of claim 7, further comprising means for storing further additional metadata in the media server's UPnP content directory service (CDS) responsive to an occurrence of a content transfer complete AVT flow control event in the network, said content transfer complete AVT flow control event corresponding to a completion of streaming of the media content from the media server over the UPnP AV network.

9. The system of claim 8, further comprising the act of tagging the media content as being completely streamed upon completion of the streaming of the media content from the media server over the UPnP AV network.

10. The system according to claim 9, further comprising the act of deleting the tagged media content from a recently played section of the media server's CDS in accordance with pre-established deletion criteria.

* * * * *